United States Patent Office 3,011,021
Patented Nov. 28, 1961

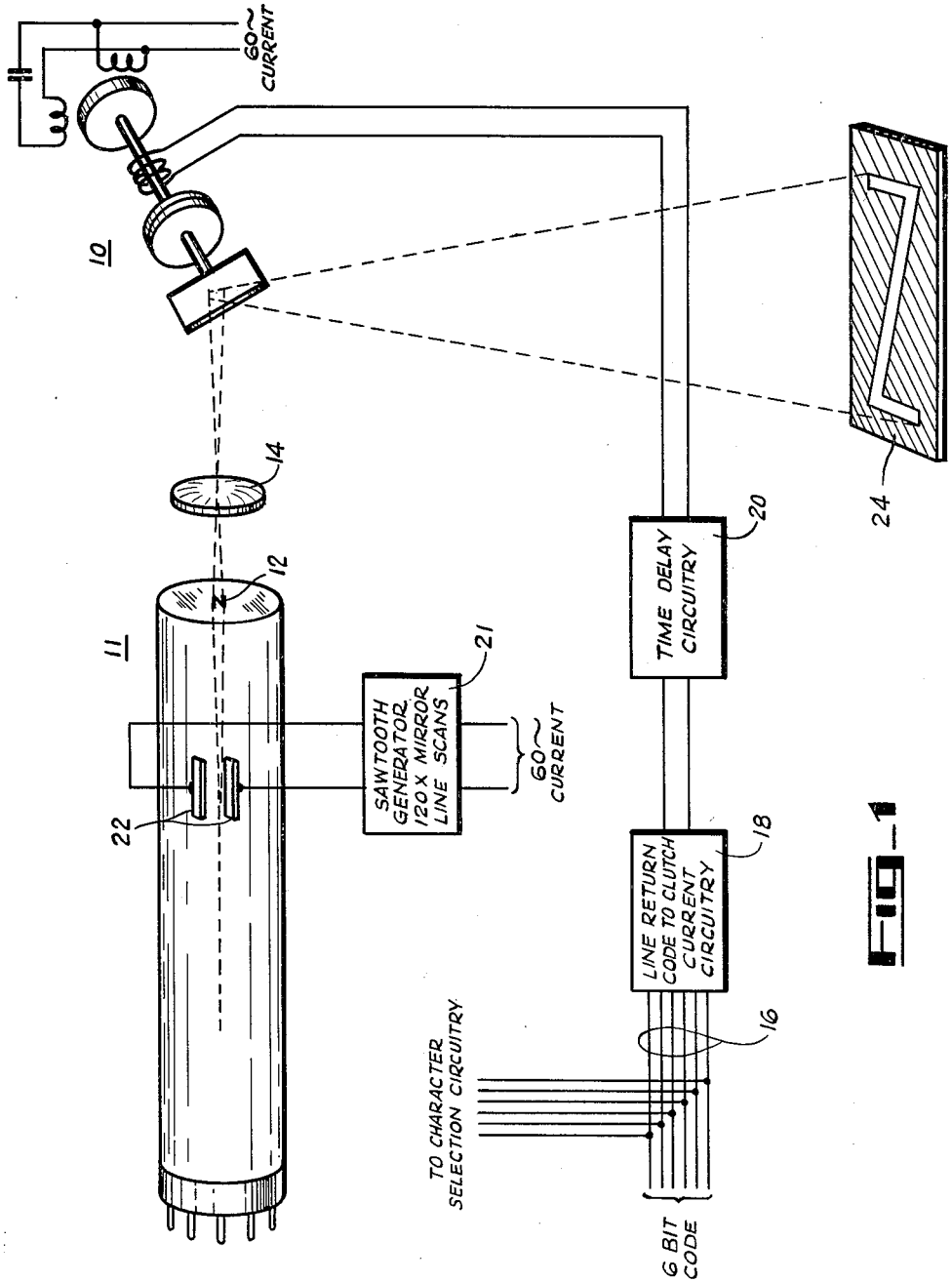

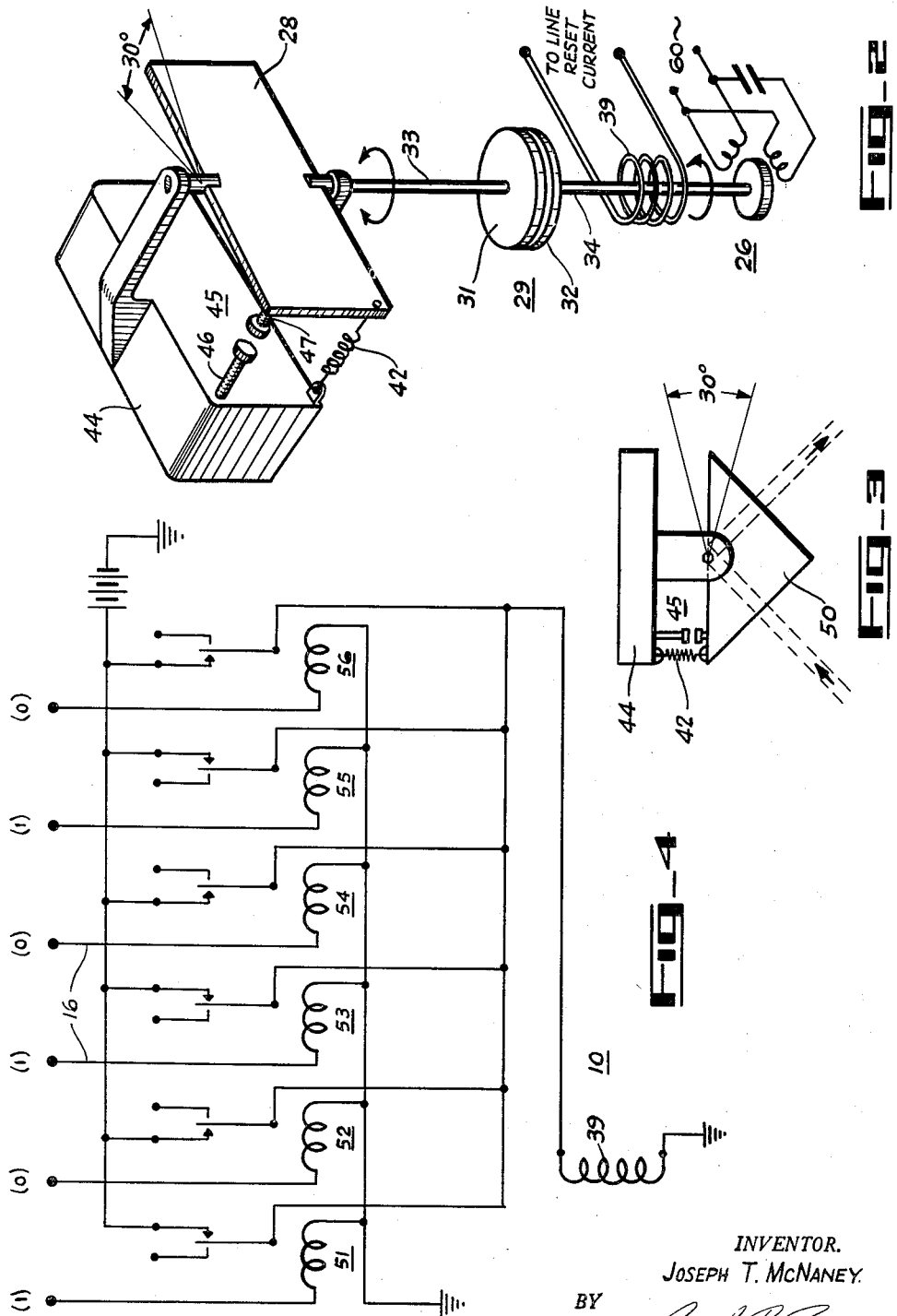

3,011,021
CHARACTER RECORDING BY MIRROR SCANNING OF CATHODE RAY TUBE IMAGE
Joseph T. McNaney, La Mesa, Calif., assignor to General Dynamics Corporation, Rochester, N.Y., a corporation of Delaware
Filed Aug. 26, 1959, Ser. No. 836,100
4 Claims. (Cl. 178—15)

This invention relates generally to a system utilizing a means for controlling small light transmissive means in arcuate movements.

In high speed recording systems such as disclosed in my copending application, Serial No. 680,289, filed August 26, 1957, and U.S. Patent No. 2,898,176, issued August 4, 1959, the utilization of small light transmissive surfaces to achieve line-at-a-time recordation from a light source presenting one or more characters at a time, is exemplified. Such light transmissive means may include prisms, single sided mirrors or multisided mirrors, but is exemplified herein as a single sided mirror similar to a galvanometer mirror. The control or rotation of such small mirrors to rapidly achieve line-at-a-time recordation, and bring them back to their initial starting point to be ready for the next line, has previously entailed rather complex control systems.

The present invention presents a rather simple system readily usable with teletype recording systems and codes, and includes a novel means for motivating and controlling the light transmissive surface. Due to the simplicity of the present system, its reliability is greatly improved over the prior systems. The present invention includes a system capable of responding to a 6 bit binary teletype code to control the mirror by a motive means. The mirror moves essentially in an arcuate movement and has interposed between the motive means and the mirror a clutch means to engage and disengage the mirror from the motive means rather quickly and efficiently, and without lost motion upon command from the teletype code, for example. Employment of the instant invention permits utilization of ordinary frequency line currents to be the synchronizing signal for character presentation as well as mirror movement, thus obviating the necessity for rather complex synchronizing systems.

It is an object of the present invention to provide a system including means for controllably moving a small light transmissive means, such as a prism or mirror surface, which system and means are simple, rugged and positive in operation.

It is another object of the present invention to provide a light transmissive control means which is relatively inexpensive and utilizes readily available, commercially obtainable component parts.

It is another object of the present invention to control minute movement of a small mirror or prism, and to do so with minimal equipment size.

Objects and advantages other than those set forth will be apparent from the following description when read in connection with the accompanying drawings in which:

FIGURE 1 is a schematic diagram of a portion of an overall system embodying the invention, and utilizing the light transmissive means to effect recordation of displayed characters along a line-at-a-time upon a surface receptive to the reflected characters;

FIGURE 2 is a detailed view, partly in perspective and partly schematic, showing the details of the light transmissive control means;

FIGURE 3 is a view exemplifying a prism to be used in place of the mirror of FIGURE 2; and FIGURE 4 is a schematic view showing an exemplary line return circuitry.

Referring more specifically to FIGURE 1 of the drawings, we have shown therein an exemplary light transmissive control means 10 utilizing, for purposes of exemplification, a mirror. Means 10 is positioned so as to receive, from a shaped beam tube 11, a character 12 through a lens 14. The shaped beam tube may be one as exemplified in Patent No. 2,898,176, and may be energized in accordance with the teachings of that application. My further U.S. Patents Nos. 2,761,988 and 2,850,723 exemplify the type of tube and the driving circuits necessary to drive such tubes.

In the present invention the showing in FIGURE 1 is descriptive of how the control means 10 will be utilized. The system including means 10 responds to the presentation of a 6 bit code received along conductors 16 for presentation to line return circuitry 18. Circuitry 18 is capable of responding to the end of the line command and to provide thereupon the output to the control means 10.

Circuitry is generally shown by the block 18, and is further detailed in FIGURE 4. As shown in FIGURE 4, circuitry 18 may be exemplified as a plurality of bistable electromagnetic relays 51 to 56. Upon receipt of binary code 101010, an arbitrarily exemplary line reset code, all relays 51 to 56 are open. Relays 51, 53 and 55 will be in an energized state, and relays 52, 54 and 56 will be in a de-energized state. Therefore, no current flow from the potential source to coil 34 is effected, de-energizing control means 10. Of course, it should be understood that while electron tubes, bistable transistors, other flip-flop circuits, as well as relays could be used in such a circuit, only the relay type circuit is exemplified herein.

The output condition of circuitry 18 is preferably presented to time delay circuits 20. Circuits 20 are well known and any known delay circuit may be used. The delay circuit 20 output is then presented to the control means 10 to control a clutch therein. Synchronization of the control means 10 and the tube character presentation 11 may be effected through the utilization of ordinary 60 cycle frequency line current, if desired. If this is done, there is preferably inserted, prior to the presentation of the line current to the final deflection plates of the tube 11, a saw-tooth generator 21. Generator 21 may, for example, multiply by 120 the mirror line scans thereby providing 120 characters to each line of mirror arcuate travel. Saw-tooth generator 21 will present its appropriate signals to the final deflection plates 22 to effect minute repositioning of the character 12 on the screen of tube 11 in accordance with the arcuate movement of the mirror.

The character 12 will then be imaged by the lens 14 onto the mirrored surface of the control means 10, and reflected therefrom onto a screen or other record medium 24 receptive to the reflected light image for recordation thereon or retransmission therefrom.

Alluding to FIGURE 2, the control means 10 is shown in greater detail and may utilize, for example, an induction synchronous motor 26, preferably powered by an ordinarily available 60 cycle frequency current source. It should be understood, however, that other frequency current sources could easily be utilized and motors matched thereto for optimum operation. The motor 26 is coupled to the light transmissive means, here shown as mirror 28, through a clutch assembly.

The clutch assembly 29 is an electrically controlled engaging and disengaging clutch assembly. Such a clutch assembly is commercially available under the trade name "Microclutch," made and sold by Magtrol Incorporated, of Buffalo, New York. The clutch consists basically of two disks 31, 32. Each of the disks 31, 32 is attached to and mounted upon its own respective shaft 33, 34 for rotation therewith. The cutch 29 has minimal or no angular displacement upon engaging or disengaging, and minimal or no backlash when engaged. No axial motion of the shaft is effected during the engagement of the clutch. Therefore, with substantially instantaneous action, minute control of the small mirror 28 is possible. While the present clutch 29 is exemplary, other clutches not shown but known to the art, such as magnetic and fluid clutches and the like which also may be made in small sizes and with little or no lost motion, could be utilized.

Normally the clutch 29 is energized and engaged. The clutch 29 may have its disks 31, 32 decoupled upon de-energizing of an actuating or induction coil 39. Upon such de-energizing of the coil 39, the disks 31, 32 of the clutch 39 will disengage. Positive disengagement may be provided by gravity as shown, or by spring action reverse current in coil 39 or any other suitable means. The clutch engagement and disengagement is under the control of the line return circuitry 18.

As is shown, the mirror 28 or prism 50 may be mounted on the shaft 33 to rotate in limited back and forth movement or oscillatory motion. In viewing FIGURE 2, as the mirror rotates from left to right under the motive force of motor 26 with the clutch 29 engaged, mirror 26 moves against a resilient means 42. Resilient means 42, which may be a spring or the like, is exemplified as attached between the mirror 28 and a fixed housing 44. As mirror 28 rotates the spring 42 extends its length and exerts positive return force upon the mirror. Therefore, when the desired extreme rotation of the mirror 28 is reached, the mirror 28 becomes disengaged from its motive power 26 (through the lack of the signal from circuit 18) thereby de-energizing the induction coil 39. In turn, disks 31 and 32 become disengaged releasing the mirror 28 from motor 26 and causing the mirror to be brought back to its beginning position by rotation from right to left under the influence of the tensioned resilient member 42. The degree of return or the initial starting point will be determined by contact between a pair of positionable bumpers or stops 45. One of the stops 46 is fastened to the fixed housing 44, and the other stop 47 is fastened to the left edge of the mirror 28. These stops may, of course, be adjustable screws or stepped pins, shown herein as screws.

As exemplified in FIGURE 2, an exemplary rotation for the mirror or prism (FIGURE 3) to achieve a line-at-a-time recordation is about 30 degrees, from left to right. Of course, this may vary considerably with the length of the line desired and the number of successive characters to be positioned in that line.

Assuming the utilization of the control means 10 in an operating system, I will exemplify that system and describe its operation in connection with a teletype code receiver. In the present exemplification, let us assume that the message code presents approximately 60 characters per second. Under this condition the following further parameters will be utilized with the control means 10 as shown in the system of FIGURE 1: namely, the characters per line will be 120; the mirror displacement from zero or start will be 30 degrees maximum; rotation of clutch disk 32 will be 6 revolutions per second; the time for each complete code will be 0.016 second; maximum line speed will be ½ line per second; and the clutch disengaged to engage speed will be 0.016 second with the motor speed synchronized with the message speed of 60 characters per second. With these conditions and further referring to FIGURE 1, a 6 bit code input circuitry utilizing the 6 input leads shown is connected to the line return circuitry 18 and to the circuits for tube 11. When the line return code is received, the clutch 29 is de-energized through de-energizing of induction coil 39. This causes disengagement of disks 31 and 32, thereby permitting the resilient means 42 to return the mirror 28 against its stops 45 to its zero or initial setting. Upon receipt of information codes after a predetermined time, as measured by the time delayed circuits 20, the clutch 29 is energized, causing disks 31 and 32 to engage and arcuately move the mirror 28. Since the duration of time between codes is 0.016 second, the engagement of disks 31, 32 takes place in time for the start of the succeeding character, space or code. Normally these clutches have closing and opening time constants of less than 2 to 3 milliseconds; therefore, desirably the time delayed circuits 20 may provide an additional time delay of 10 to 12 milliseconds to effect proper timing.

The movement of the character shaped beam presenting its characters 12 in the tube 11 is in synchronism with the mirror movements as both are under the control of the 60 cycle current. The 60 cycle current is coupled to the saw-tooth generator 21, thereby applying the 60 cycles saw-tooth wave across the final deflection plates 22. The character shaped beam or character 12 will therefore be moved an amount equal to something less than normal character width to compensate for the mirror movements and present to the record medium 24 a stationary non-moving character. This is also disclosed in the broad sense more completely in Patent No. 2,898,176. It should be understood that the record medium or screen 24 that is responsive to light images, may include photosensitive papers, films, drums, or other light responsive devices, and may be either stationary or in motion, as may be desired. The record medium 24, as exemplified in the instant operational requirements, will be in step by step motion, moving the paper screen along a step at a time and, as long as line reset is effected in less time than a complete line cycle, the motion need not be stopped. In this event each line cycle may consist of two full seconds, that is, 1.983 seconds to record 119 characters or spaces, and 0.0166 second to reset the line to the beginning of the next line. Such operation, of course, is equivalent to recordation at the rate of 60 characters per second.

The particular embodiments of the invention illustrated and described herein are illustrative only, and the invention includes such other modifications and equivalents as may readily appear to those skilled in the art, within the scope of the appended claims.

I claim:
1. A system for transferring characters from a screen to a recording medium, said system comprising a screen, a source of coded sequentially-presented character-selecting and line-return signals, means for sequentially displaying selected characters upon said screen in response to the reception of said character-selecting signals, a recording medium, a movable optical member capable of receiving said characters from said screen for redirection upon said recording medium, a source of A.C. voltage, means connected to said source of A.C. voltage for synchronously moving said optical member from a given position to scan in a line along said recording medium, means connected to said moving means for disconnecting said moving means from said optical member in response to the application of said line-return signals, means connected to said optical member for returning said optical member to said given position upon the disconnection from said moving means, a deflection system for controlling the positioning of selected characters upon said screen, means connected to said source of A.C. voltage for synchronously energizing said deflection system to provide a plurality of predetermined movements of said characters upon said screen during the time necessary for said optical member to complete the scanning of a line of said recording medium, said predetermined movement being such that the movement of said characters upon said screen compensates for the movement of said optical member to thus render the projected images stationary on said recording medium.

2. The combination of claim 1 in which said moving means includes a synchronous motor connected across said source of A.C. voltage and said disconnecting means includes a clutch interposed between said motor and said optical member, which is responsive to the receipt of said line-return signal to disconnect said optical member from said motor.

3. The combination of claim 2 in which said optical member returning means includes means for biasing said optical member toward said given position to thereby provide automatic line-return of said optical member upon receipt of a line-return signal.

4. The combination of claim 3 in which said deflection system energizing means comprises sawtooth sweep generating means connected to be synchronously driven from said source of A.C. signals whereby the movements of said optical member and said displayed characters are in synchronism.

References Cited in the file of this patent
UNITED STATES PATENTS

| | | |
|---|---|---|
| 1,893,158 | Chireix et al. | Jan. 3, 1933 |
| 2,163,537 | Clothier et al. | June 20, 1939 |
| 2,859,427 | McNaney | Nov. 4, 1958 |
| 2,875,275 | Willcox et al. | Feb. 24, 1959 |